April 19, 1932.  J. M. CRAWFORD  1,855,166
ROCKER ARM LUBRICATION
Filed April 11, 1930   2 Sheets-Sheet 1
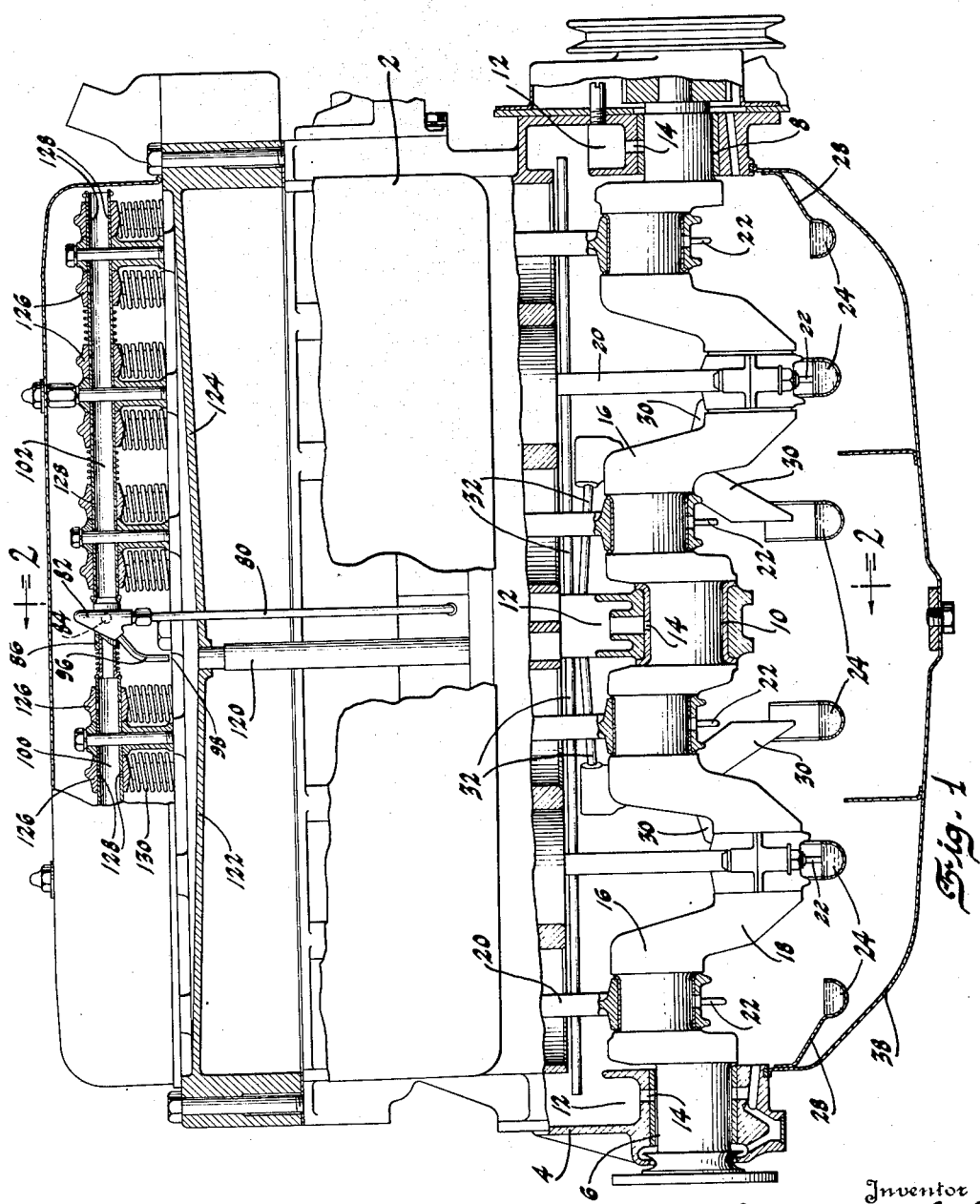

April 19, 1932. J. M. CRAWFORD 1,855,166
ROCKER ARM LUBRICATION
Filed April 11, 1930 2 Sheets-Sheet 2
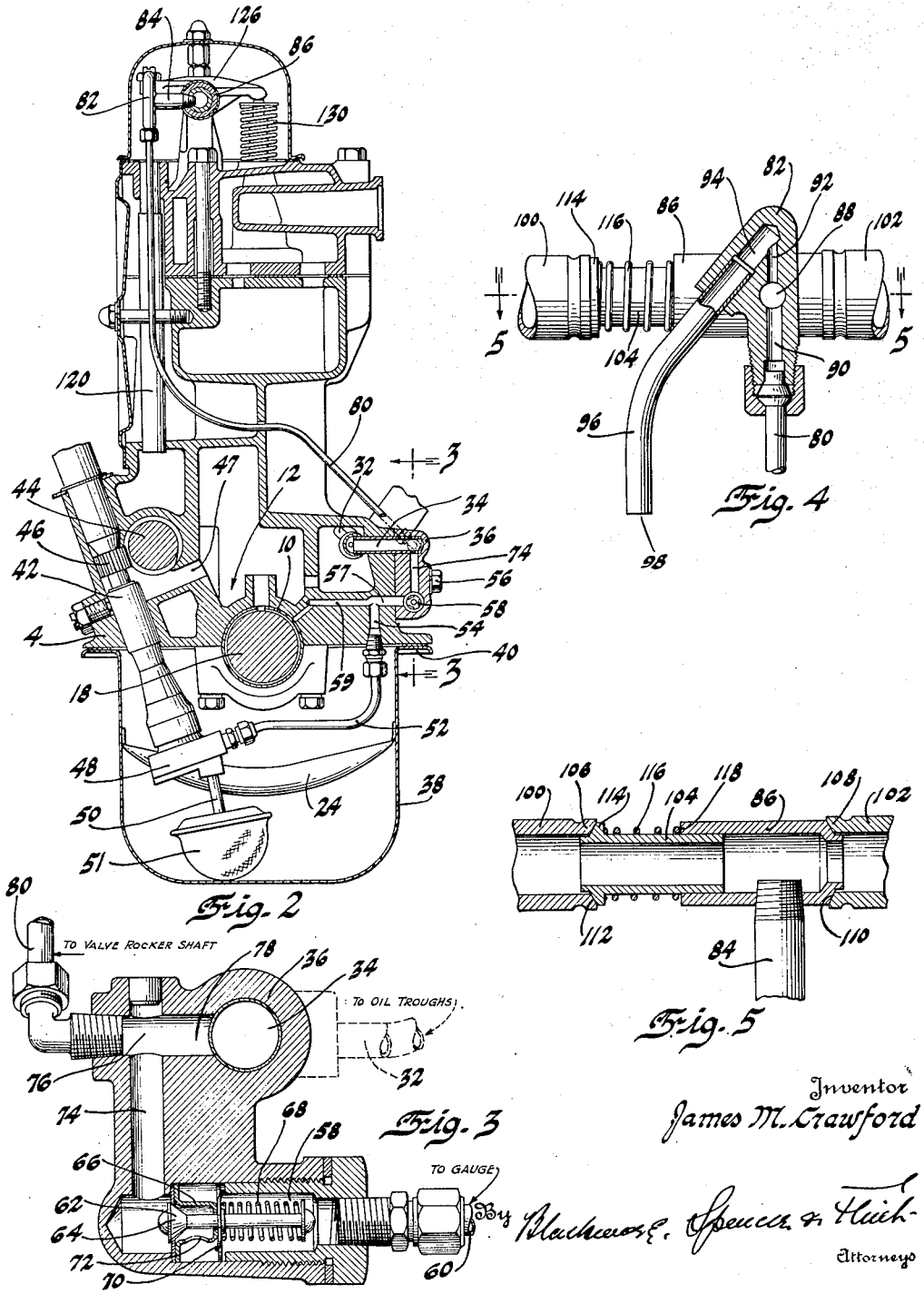

Patented Apr. 19, 1932

1,855,166

UNITED STATES PATENT OFFICE

JAMES M. CRAWFORD, OF DETROIT, MICHIGAN, ASSIGNOR TO GENERAL MOTORS CORPORATION, OF DETROIT, MICHIGAN, A CORPORATION OF DELAWARE

ROCKER ARM LUBRICATION

Application filed April 11, 1930. Serial No. 443,339.

This invention relates to lubricating systems for internal combustion engines and has particular reference to the lubrication of the rocker arm shaft.

Prior lubricating systems of internal combustion engines involving an overhead rocker arm shaft, have made use of a pressure system, which is maintained inside the hollow rocker arm shaft to lubricate the rocker arm bearings. In the present invention, it is an object to lubricate the rocker arm bearings by the lubricant forced from the usual pump but to maintain substantially atmospheric pressure in the lubricating system within the hollow rocker arm shaft. The pressure of the pump is accordingly not transmitted to the rocker arm shaft.

The object of the invention is accomplished by providing a pipe or oil feed line from the pump to a fitting adjacent the rocker arm shaft. The fitting is connected to the interior of the shaft and has an over-flow connection open to the atmosphere above its port or connection to the shaft. The over-flow or excess oil falls back to the oil pan through a pipe positioned laterally centrally of the engine and located at the bottom of the troughs inclined from the end toward the center of the engine.

The rocker arm shafts of the engine comprises two aligned shafts interconnected at their center. The connection comprises two telescopic tubular members, the ends of which are formed into seats which fit on corresponding seats formed in the ends of the rocker arm shafts. A coil spring surrounding one of the telescopic members and resting and pressing against a shoulder thereon, forces the two apart to rigidly hold them on their seats to prevent leakage of oil.

On the drawings:

Figure 1 is a side elevation of an internal combustion engine with parts broken away and shown in section to illustrate the invention.

Figure 2 is a section taken substantially on the line 2—2 of Figure 1.

Figure 3 is a section on the line 3—3 of Figure 2 taken through the oil distributor.

Figure 4 is an enlarged detailed view, with parts shown in section, of the oil fitting and its connection to the rocker arm shafts.

Figure 5 is a section through the telescopic members interconnecting the rocker arm shafts, taken substantially on the line 5—5 of Figure 4.

Referring to the drawings, the numeral 2 indicates an internal combustion engine as a whole. The crankcase is shown at 4 and has the end bearings 6 and 8 and the intermediate bearings 10, each of which has a pocket 12 thereover with an opening 14 leading to the bearings. The pockets 12 are for the purpose of receiving and holding oil to lubricate the bearings.

The engine is shown as of the six-cylinder type and has six throws 16 to the crankshaft 18. A connecting rod 20 is attached to each throw and each connecting rod has the finger 22 which, in its lowermost position, is adapted to dip into the oil in the troughs 24 positioned beneath each connecting rod 20. The end troughs 24 are adapted to receive oil from the end bearings 6 and 8 as well as the oil dripping onto the aprons 28 to which the endmost troughs 24 are attached. The intermediate troughs 24 receive oil from the channels 30 which are supplied from pipes 32 which receive oil from the pipe 34 (Figures 2 and 3) connected to the oil distributor head 36.

The oil pan is indicated at 38 and is secured to crankcase 4 at 40 by means of bolts (not shown). A combined oil pump and distributor drive 42, driven from camshaft 44 by means of the gearing 46, drives the oil pump 48. A lubricant passage for the drive 42 is shown at 47. The inlet 50 of the pump has the screen 51 thereover which rests on the bottom of the oil pan 38.

After taking up the oil from the oil pan, the pump passes the oil through the outlet pipe 52, through the passage 54 in a rib in the crankcase and to the oil distributor head 36, secured to the side of the crankcase by means of the bolts 56. The distributor head has a passage 57 which conforms to the passage 54 and receives oil in the chamber 58. A passage 59, a continuation of passage 57, supplies oil to the mid bearing 10. One side of the chamber 58 is connected by means of the pipe 60 to the oil gage on the opposite side and has the pressure valve 62 to impede the flow of oil. The details of the pressure valve are shown and described in the copending application of Cram and McKinley, Serial No. 192,712, filed May 19, 1927. The pump will build up the pressure in the chamber 58 and force the oil to unseat the valve 64 from its seat on the cage 66 against the pressure of the coil spring 68. The disc 70, held on top of the cage 66 by means of the spring 68, has a plurality of slits therein, one side of which is bent away from the plane of the disc and gives a swirl to the oil as it passes the disc 70. The cage 66 has the openings 72 in its side to permit passage of oil. After passing the valve 64, the oil or lubricant flows into the passage 74 and divides at the junction 76 of the passage 74 with a passage 78 which leads to the pipe 34 conducting the oil to both the troughs 24 and to a pipe or conduit 80 which conducts the oil upwardly toward the top of the engine.

As the oil reaches the junction 76 (Figure 3) it will follow the lines of least resistance and flow toward the pipe 34 to be delivered to the troughs. However, the supply of oil delivered by the pump and the head under which it is delivered is considerably in excess of that which can be taken care of by the pipe 34. The excess oil will, therefore, be forced upwardly through the pipe 80 toward the rocker arm shaft.

The upper end of the pipe 80 terminates in a fitting 82 having a lateral arm 84 threaded into a short tube or cylinder 86. The lateral arm 84 is hollow as indicated at 88 and receives oil from the bore 90 connected to the pipe 80. The bore 90 is continued upwardly beyond the passage 88 as indicated at 92 and connects with a downwardly extending passage 94 to which a short pipe 96 open to the atmosphere at 98, is connected.

The rocker arm shafts of the invention comprise the aligned hollow shafts 100 and 102 interconnected at their center by means of the telescopic cylindrical or tubular members 86 and 104. Each shaft end is formed into a seat as indicated at 106 and 108 and the corresponding ends of the tubular members 86 and 104 are formed into conformable seats 110 and 112. The tubular member 104 is formed with the flange or shoulder 114 and the coil spring 116 is confined between the shoulder and the end 118 of the larger telescopic member 86. The use of two shafts 100 and 102 lends the structure to a more ready assembly and the purpose of the structure of Figure 5 is to form an easily installed connection between the shaft ends and one which will permit the ready removal of either shaft independent of the other. The connection also forms a lubricant flow means from the fitting 82 to the interior of the hollow shafts 100 and 102.

The oil from the pipe 80 will rise until it reaches the passage 88 where it will flow to the interior of the shafts 100 and 102 from the telescopic tubular members 86 and 104. When the shaft is filled, the excess oil will rise in the passage 92 and flow downward in the passage 94 and 96 and fall into a pipe 120 positioned at the lateral central portion of the engine and at the bottom of troughs 122 and 124 inclined from the two ends of the engine toward the center. The oil from the pipe 120 is returned to the oil pan to be again taken up by the pump 48.

Each rocker arm shaft 100 and 102 has the rocker arms 126 mounted thereon and openings 128 in the shafts 100 and 102 of the rocker arm permit the rocker arm to lubricate the bearing surfaces between the rocker arm shafts and the rocker arms. The rocker arms 126 are connected by the usual tappets (not shown) with the camshaft 44 and with the usual valve stems (not shown) to operate the valves. Coil springs 130 are applied in the usual way to hold the tappets against the camshaft and hold the valves in closed position.

From the description of the lubricating system applied to the rocker arm shafts, it will be apparent that the pressure of the pump does not maintain in the interior of the shaft but because atmospheric pressure is transmitted through the pipe 96, the pressure within the shafts will be substantially the pressure of the atmoshere and there will be no forcing of excess oil to the rocker arm bearings. The flow of oil to the rocker arm bearings will be in the natural way and such as the needs of the bearings will require. One of the advantages gained by the system of rocker arm lubrication is the fact that sufficient oil is supplied at as low a speed as possible. The tube or pipe 80 is also rather large to permit the handling of heavy oil due to low temperature.

I claim:

1. In a lubricating system for internal combustion engines having a plurality of rocker arms, a plurality of aligned hollow shafts for mounting said arms, means for conducting lubricant to said shafts, means connecting said shafts for causing the lubricant to flow therebetween, and resilient means urging said connecting means toward said shafts.

2. In a lubricating system for internal combustion engines having a plurality of rocker arms, a plurality of aligned hollow shafts for mounting said arms, means for supplying lubricant to one of said shafts, a tubular device interconnecting said shafts for causing lubricant to flow therebetween, seats between said device and shafts, and resilient means urging said device on its seats.

3. In a lubricating system for internal combustion engines having a plurality of rocker arms, a plurality of aligned hollow shafts for mounting said arms, means for supplying lubricant to said shafts, means connecting said shafts for causing the lubricant to flow therebetween, a shoulder on said means, and resilient means pressing against said shoulder and urging said connecting means toward said shafts.

4. In a lubricating system for an internal combustion engine having a plurality of aligned hollow rocker arm shafts, rocker arms on said shafts, said shafts having openings to deliver lubricant to the rocker arm bearings, telescopic members interconnecting said shafts, resilient means pressing said telescopic members apart and urging them into engagement with the ends of the shafts, and means to deliver lubricant to the shafts.

5. In a lubricating system for internal combustion engines having a plurality of aligned hollow rocker arm shafts, rocker arms on said shafts, said shafts having openings to deliver lubricant to the rocker arm bearings, hollow telescopic members interconnecting said shafts, resilient means pressing said telescopic members apart and urging them into engagement with the ends of the shaft, and means to deliver lubricant to the telescopic members.

6. In a lubricating system for internal combustion engines having a plurality of aligned hollow rocker arm shafts, rocker arms on said shafts, said shafts having openings to deliver lubricant to the rocker arm bearings, telescopic members interconnecting said shafts, a shoulder on one of said members, resilient means between said shoulder and the other member and constantly urging said members apart and into engagement with the ends of the shafts, and means to deliver lubricant to the shafts.

In testimony whereof I affix my signature.

JAMES M. CRAWFORD.